Figure 1:
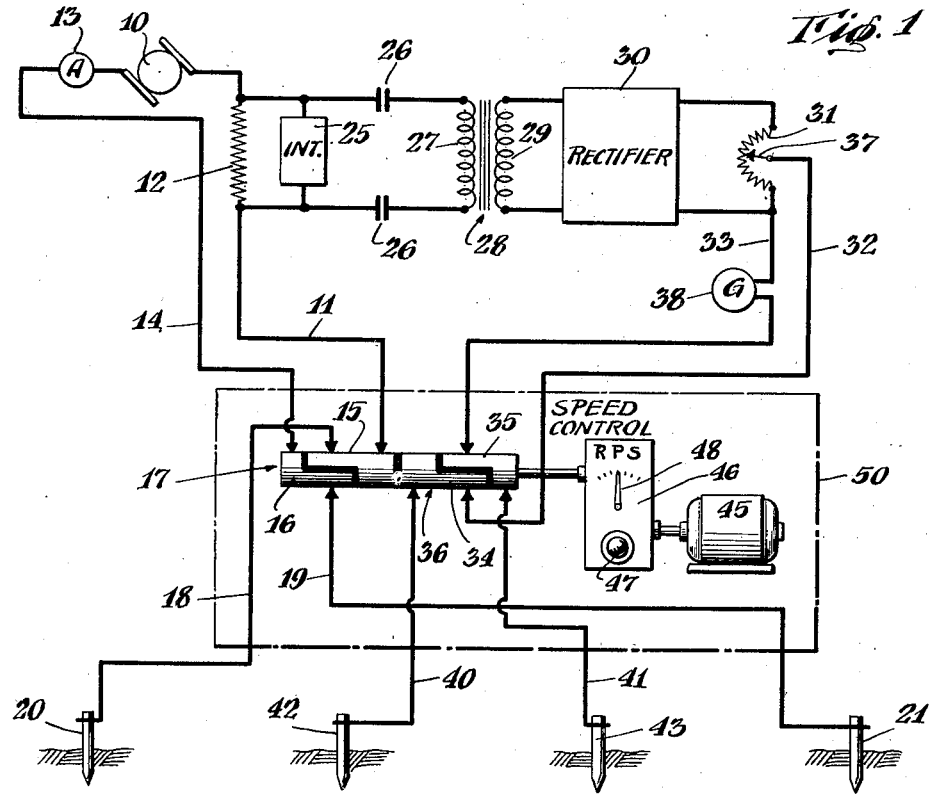

Sept. 1, 1942.  K. H. EVJEN  2,294,395
METHOD AND APPARATUS FOR MAKING GEOLOGICAL EXPLORATIONS
Filed Dec. 20, 1939

INVENTOR
Knute H. Evjen
BY
ATTORNEY

Patented Sept. 1, 1942

2,294,395

UNITED STATES PATENT OFFICE 2,294,395

METHOD AND APPARATUS FOR MAKING GEOLOGICAL EXPLORATIONS

Knute H. Evjen, Coudersport, Pa., assignor to Nordel Corporation, Houston, Tex., a corporation of Delaware Application December 20, 1939, Serial No. 310,109

17 Claims. (Cl. 175—182)

This invention relates to a method of making geological explorations and more particularly to a novel and improved method of electrical prospecting and to an apparatus for carrying out the same.

In the potential method of electrical prospecting, the impedance of the earth at various points and depths is determined by passing an electrical current through the earth between a pair of current electrodes and measuring the potential difference between two other points adjacent the earth's surface within the field of influence of the earth current thus produced. Measurements of this type require the simultaneous reading of the earth current and of the induced potential and the computation of the earth's apparent resistivity from these values. Such methods are difficult to operate in the field due to the necessity for accurately regulating the current and making two accurate readings simultaneously. Furthermore, after the readings are obtained, it is necessary to compute the corresponding apparent resistivity before the results can be interpreted.

It is an object of the present invention to provide a system of the above type in which the necessity for making a plurality of simultaneous measurements is eliminated.

Another object is to provide a measuring system which may be calibrated in units which represent the geophysical condition of the earth at the points being investigated, so that the readings may be interpreted directly without the necessity for mathematical calculations.

Another object is to provide a novel and improved system for measuring the geophysical aspects of the earth at various depths.

Various other objects and advantages will be apparent as the nature of the invention is more fully disclosed.

Although the novel features which are believed to be characteristic of this invention are more particularly pointed out in the claims appended hereto, the invention itself may be better understood by referring to the following description, taken in connection with the accompanying drawing, in which certain specific embodiments thereof have been set forth for purposes of illustration.

Figure 2:
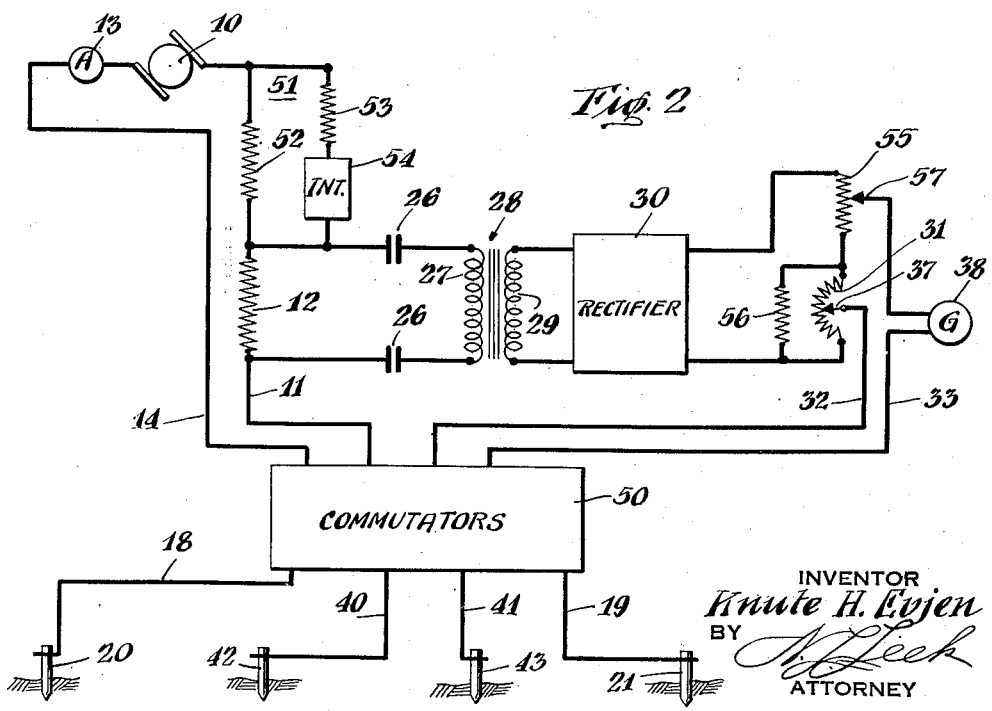

In the drawing,

Fig. 1 is a schematic representation of an electrical prospecting system embodying the present invention; and Fig. 2 is a similar schematic representation illustrating a different embodiment of the invention.

In accordance with the present invention, a potential measurement is obtained which bears a definite relationship to the current flowing through the earth between the current electrodes. This relationship is substantially independent of the actual current flowing and may, for example, be in direct proportion thereto, although in practice the reading may vary somewhat from a direct proportion. Inasmuch as the potential reading bears a definite relationship to the earth current, it is unnecessary to measure the actual potential difference or to measure the actual earth current, the relationship, when reduced to proper units, being suitable for making the subsequent interpretation of the readings.

The present invention accordingly provides a means for obtaining a measuring potential which bears a definite relationship to the current flowing in the earth circuit and may be compared with the potential induced between the measuring or potential electrodes.

In a system of this type, it is preferable to obtain a measuring potential which is not directly connected to the ground circuit. Otherwise, it would be necessary to adjust the measuring potential to correspond exactly to the absolute potential of the points being measured. In one embodiment of the present invention this is accomplished by converting the potential drop across a resistance in the earth current circuit into alternating current, as by means of an interrupter, supplying this current to the primary of a transformer, rectifying the secondary current, and passing the rectified current through a potentiometer. The potential drop thus developed across the potentiometer bears a definite relationship to the current flowing in the first mentioned resistance and in the earth circuit. The measuring potential is taken from the potentiometer and may be adjusted to exactly counterbalance the potential being measured. A galvanometer or the like may be used for determining when an exact balance is reached.

The only reading which is required in this system is the setting of the potentiometer by which the measuring potential is obtained. This potentiometer may be calibrated in suitable units which correspond to the earth's electrical characteristics and may be interpreted to indicate the variations in the earth's apparent resistivity without further calculations.

It has been found that in electrical prospecting, direct current or very low frequency alternating currents, such as frequencies of from one-half to twenty cycles per second, are necessary in order to penetrate to substantial depths such, for example, as depths below 2000 ft. High frequency currents do not penetrate the earth to any great distance. The present system accordingly is adapted for obtaining a set of measurements, termed a potential spectrum, taken between fixed points at different low frequencies. A set of such potential spectra taken at different locations on the earth's surface may be interpreted according to well known electrical prospecting methods to give an indication of the nature and distribution of the subterranean strata. Such measurements are particularly useful in prospecting for oil bearing strata and the presence of oil may frequently be detected directly due to the extremely high resistance of the oil as compared to the usual earth strata.

The extremely low frequencies may be readily obtained by various means, such, for example, as a commutator which may be driven at controlled speeds, or by suitable reversing relays which may be actuated by controlled oscillators, or in various other ways. In such a system the earth current and the induced potential in the measuring circuit are reversed in synchronism so that a uni-directional potential is obtained for purposes of measurement.

One embodiment of this invention is shown more in detail in Fig. 1. Referring to this figure, the earth current circuit comprises a source 10 of direct current, such as a generator or battery. The source 10 is connected in series circuit with a line 11, a resistance 12, an ammeter 13 and a line 14. Lines 11 and 14 are connected to segments 15 and 16 respectively of a reversing commutator 17 which is driven by suitable means to be described. Alternating current is taken from the commutator 17 by means of lines 18 and 19 respectively which are connected to suitable ground electrodes 20 and 21 herein referred to for convenience as current electrodes. The current electrodes 20 and 21 are spaced a convenient distance apart, which may be of the order of several thousand feet, and when the commutator 17 is driven at a suitable speed, an alternating current having a frequency corresponding to the speed of rotation of the commutator passes through the earth circuit. This current may be measured by the ammeter 13 and may be adjusted within desired limits by suitable regulation of the source 10.

It will be noted that a potential drop is built up across the resistance 12 which is directly proportional to the current flowing in the earth circuit. This potential drop is utilized in the present system for obtaining the measuring potential. For this purpose, an interrupter 25 is connected across the resistance 12 and the opposite ends of said resistance are connected through condensers 26 to the primary 27 of the transformer 28. The interrupter 25 periodically short circuits the resistance 12 and thereby produces a variable potential across the primary of the transformer 27 which produces an alternating current in the secondary 29 thereof. The interrupter 25 may operate at any desired frequency, dependent upon the characteristics of the transformer 28. A frequency of the order of 500 per second has been found suitable, although it is to be understood that various other frequencies may be employed. The condensers 26 should be of sufficiently high capacity to efficiently pass currents of this frequency or may be omitted in certain instances.

In the present embodiment, the condensers prevent the direct current from passing through the primary of the transformer and saturating the magnetic circuit thereof. They also prevent a direct metallic connection between the transformer and the earth current circuit.

The alternating current induced in the secondary 29 is rectified by a suitable rectifier 30 which may be of any desired type, such, for example, a space discharge rectifier or an electrolytic rectifier, such as a copper oxide rectifier. The rectified current is supplied to a potentiometer 31 and passes therethrough to build up a potential drop across said potentiometer. The potentiometer 31 is connected by lines 32 and 33 to segments 34 and 35 respectively of a reversing commutator 36 which is driven in synchronism with the commutator 17. The line 33 may be connected to the movable contact 37 of the potentiometer 31 to permit adjustment of the potential across the lines 32 and 33. A galvanometer 38 is connected in series with one of the lines, such as, the line 32. This galvanometer is preferably of the highly damped type so that it is influenced only by the direct current component and not by any ripple or other alternating current component in the circuit under measurement.

The segments 34 and 35 of the commutator 36 are connected by lines 40 and 41 respectively to electrodes 42 and 43, herein termed potential electrodes, which are inserted in the earth at points within the field of influence of the currents flowing between the current electrodes 20 and 21. The commutator 36 is so connected that the potential applied by the potentiometer 31 opposes the potential induced between the potential electrodes 42 and 43, so that a condition of balance is indicated by a zero reading on the galvanometer 38.

The commutators 17 and 36 may be driven by suitable means, such as a motor 45, through a suitable control box 46 which may comprise a gear box or a rheostat for adjusting the motor speed. A control handle 47 is provided for controlling the motor speed as desired. The speed of rotation of the commutator 17 may be indicated on a speed indicator 48.

Operation

In the operation of this system, the current electrodes 20 and 21 are located at selected points in the earth and the potential electrodes 42 and 43 are located at points within the field of influence of the earth currents produced between the current electrodes. The source 10 is adjusted to pass a predetermined amount of current through the earth circuit, as indicated by the ammeter 13. The frequency of alternation of the current is regulated by making suitable adjustment of the control handle 47. If the measurements are to be taken with direct current, the commutator 17 remains stationary. For low frequency alternating current, the commutator is slowly rotated at the selected speeds as indicated by the speed indicator 48. It will be noted that the potential drop in the resistance 12 will vary in proportion to the amount of current flowing in the earth circuit. The interrupter 25, by intermittently bridging this resistance 12, causes a pulsating current to flow in the primary of the transformer 28 which bears a definite relationship to the amount of current flowing in the earth circuit. The value of the resistance 12 is so chosen that only a small fraction of the total current flowing is the earth circuit is converted into pulsating current. The pulsating current thus produced may, for example, correspond to about 1% of the earth current. The alternating current in the secondary of the transformer 28 is rectified by the rectifier 10 to produce a direct current which is impressed upon the potentiometer 21 to cause a potential drop thereacross which bears a predetermined relationship to the total current flowing in the earth circuit. In certain instances, suitable filters may be incorporated in the rectifier circuit to eliminate the ripple and produce a uniform direct current, or the same effect may be obtained by using a highly damped galvanometer 38. Inasmuch as the potentiometer 31 is not directly connected to the earth circuit, that is, is ungrounded, the absolute potential developed thereacross is floating with respect to ground and may be used for purposes of measurement without adjustment to correspond to the ground potential at the points of measurement.

When earth current flows between the electrodes 20 and 21, a potential difference is induced between the electrodes 42 and 43. This potential difference corresponds in direction to the direction of current flow between the electrodes 20 and 21 and will reverse simultaneously therewith. The potential difference between the electrodes 42 and 43 is converted from an alternating potential to a unidirectional potential by the commutator 36 which operates in synchronism with the commutator 17, thereby applying a uni-directional potential across the lines 32 and 33. A filter may be included in the measuring circuit if desired, although the use of a highly damped galvanometer usually renders electrical filters unnecessary. This potential is compared with the potential drop across the potentiometer 31 by making suitable adjustment of the movable contact 37 thereof until a point of balance is reached as indicated by the galvanometer 38.

The potentiometer 31 may be suitably graduated in convenient units, and when the balance is obtained, the reading corresponding to the point of adjustment is noted. The frequency is also noted from the indicator 46. This reading, taken from the potentiometer 31, represents a definite earth characteristic at a depth which is determined by the penetration of the earth current at the particular frequency at which the measurement is being taken. The potential developed across the potentiometer 31, being dependent upon the total value of the earth current at the instant that the measurement is being taken, automatically compensates for any variations in electrode resistance or in contact resistance and eliminates any necessity for making simultaneous measurements of the earth current and the induced potential.

This measurement is repeated with different frequencies until a complete potential spectrum of the area between electrodes 42 and 43 is obtained. These electrodes may then be moved to another location and the measurements repeated to obtain a potential spectrum at various frequencies in the manner above pointed out. The various spectra thus obtained may be interpreted to show the characteristics of the earth's strata in the area under investigation. It is to be understood, of course, that the potential electrodes may be variously positioned with respect to the current electrodes 20 and 21 and that the positions thereof may be changed in accordance with the depth which is under investigation at any particular instant.

It will be noted that in the above described system only a single reading need be taken and the necessity for mathematical calculations is avoided. The system is accordingly well adapted to field use and may be operated by unskilled persons. The data thus compiled may be interpreted by geological physicists in accordance with well known principles.

The size of the electrodes may vary over wide limits. In practice, metal stakes about one or two inches in diameter and 3 ft. or 4 ft. in length have been found satisfactory. The distance between the current electrodes may vary widely, for example, from 200 ft. to 5000 ft., depending upon the depth to be investigated. The potential of the source 10 may likewise be adjusted as desired. Voltages of 100 volts to 200 volts and earth currents of one to two amperes have been found satisfactory.

In the embodiment shown in Fig. 2, the parts corresponding to Fig. 1 have been identified by similar reference characters. The commutators 17 and 36 and the control mechanism therefor have been indicated by the rectangle 50. It is to be understood that these commutators may be similar to those shown in Fig. 1 or that any other suitable type of synchronized reversing means may be used.

In this embodiment the source 10 is connected in series with shunt circuit 51 comprising a resistance 52 in one branch and a resistance 53 and interrupter 54 in the second branch. This shunt circuit 51 is connected in series with the resistance 12 corresponding to the resistance 12 of Fig. 1. The relationship between the pulsating current produced by the interrupter 54 and the direct current may be accurately controlled by means of the relative sizes of the various resistances. These resistances may be designed to produce a pulsating current representing not over 1% of the direct current flowing in the earth circuit. The resistance 53 may be omitted, if desired, depending upon the characteristics of the remaining elements in the circuit.

The potentiometer circuit is shown as comprising a variable resistance 55 in series with the potentiometer and a shunt resistance 56. The measuring potential may be taken between the movable contact 37 of the potentiometer 31 and a movable contact 57 of the resistance 55. The resistance 55 and 56 provide for the regulation and control of the rectified current. It is to be understood that these resistances may also be used in the system of Fig. 1 if desired.

The system of Fig. 2 operates similarly to the system of Fig. 1 and the description thereof will not be repeated.

While certain specific embodiments of the invention have been shown for purposes of illustration, it is to be understood that the invention is not to be limited thereto, but is capable of various uses, as will be readily apparent to a person skilled in the art. The invention is only to be limited in accordance with the scope of the following claims.

What is claimed is:

1. The method of electrical prospecting which comprises passing a current having a predetermined frequency through the earth between two spaced points adjacent the surface of the earth, picking up the potential difference between two other points adjacent the earth's surface and lying within the field of influence of said earth current, deriving from said potential difference a measure of the electrical characteristics of the earth in the area under investigation, and repeating the measurement at different selected frequencies below about 20 cycles per second to obtain a spectrum of the potential representing variations in characteristics of the earth's strata at various depths below the surface.

2. The method of electrical prospecting which comprises passing a current having a predetermined frequency through the earth between two spaced points adjacent the surface of the earth, picking up the potential difference between two other points adjacent the earth's surface and lying within the field of influence of said earth current, producing a measuring potential which bears a definite relationship to the total earth current at any given instant, obtaining a direct measurement of the electrical characteristics of the earth in the area under investigation by measuring the relationship between said measuring potential and said potential difference at the instant of measurement, and repeating the measurement at different selected frequencies below about 20 cycles to obtain a spectrum of the earth potential representing the variations in earth strata at various depths below the surface.

3. In a system for electrical prospecting including an earth current circuit having means for passing a current of predetermined frequency through the earth between two spaced points adjacent the surface of the earth, and a measuring circuit including means for picking up the potential difference between two other points adjacent the earth's surface and lying within the field of influence of said earth current, the method of obtaining a measuring potential for use in measuring said potential difference which comprises converting a predetermined portion of the earth current into an alternating current having a frequency higher than said predetermined frequency, transforming said alternating current, rectifying the transformed current, and passing the rectified current through a resistance to produce a unidirectional potential drop therein which bears a definite relationship to the total earth current.

4. A system for electrical prospecting comprising an earth current circuit including a source of direct current, a pair of spaced earth electrodes, reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current, means for converting the picked-up potential difference into a uni-directional potential, means producing a unidirectional measuring potential which bears a definite relationship to the total earth current, and means for measuring the relationship between said uni-directional picked-up potential and the simultaneously produced unidirectional measuring potential, to thereby obtain a direct measurement of the electrical characteristics of the earth in the area under investigation which is substantially independent of variations in the earth current circuit.

5. A system for electrical prospecting comprising an earth current circuit including a source of direct current, a pair of spaced earth electrodes, reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current, means for converting the picked-up potential difference into a uni-directional potential, means converting a predetermined portion of the current flowing in the earth current circuit into an alternating current having a frequency higher than said predetermined frequency, a transformer having a primary connected to receive said alternating current, means rectifying the secondary current of said transformer, a resistor connected to carry said rectified current whereby a unidirectional potential drop is produced therein which is directly related to the total earth current, and means measuring the relationship between said uni-directional picked-up potential and the simultaneously produced unidirectional potential drop, for thereby obtaining a direct measurement of the electrical characteristics of the earth in the area under investigation which is substantially independent of variations in the earth current circuit.

6. A system for electrical prospecting comprising an earth current circuit including a source of direct current, a pair of spaced earth electrodes, reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current, means for converting the picked-up potential difference into a uni-directional potential, a measuring circuit which is electrically independent of said earth current circuit, a resistance in said measuring circuit, means comparing the potential drop across said resistance with said uni-directional potential, and means controlled by the total current flowing in said earth current circuit for producing a direct current in said measuring circuit which bears a definite relationship to the earth current.

7. A system for electrical prospecting comprising an earth current circuit including a source of direct current, a pair of spaced earth electrodes, reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current, means for converting the picked-up potential difference into a uni-directional potential, a resistor element connected to carry a predetermined portion of the current in said earth circuit, means utilizing the potential drop in said resistor element to produce an alternating current having a frequency higher than said predetermined frequency, a transformer having a primary connected to receive said alternating current, means rectifying the secondary current of said transformer, a resistor element connected to carry said rectified current for thereby producing a unidirectional potential drop which is directly related to the current in said earth circuit, and means utilizing said potential drop as a measure of said unidirectional picked-up potential, for thereby obtaining a direct measurement of the electrical characteristics of the earth in the area under investigation which is substantially independent of variations in the earth current circuit.

8. A system for electrical prospecting comprising an earth current circuit including a source of direct current, a pair of spaced earth electrodes, reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current, means for converting the picked-up potential difference into a uni-directional potential, a resistance connected to carry a predetermined portion of the current flowing in said earth current circuit, interrupter means connected to periodically vary the potential drop across said resistance for thereby producing a pulsating current, a transformer having a primary and secondary connected to translate said pulsating current into a related alternating current in a separate circuit, means rectifying the secondary current of said transformer, a potentiometer connected to pass said secondary current for thereby developing a potential drop which is directly related to the current flowing in the earth circuit, and means balancing said uni-directional picked-up potential against a selected portion of the potential drop across said potentiometer, to obtain a direct measurement of the electrical characteristics of the earth in the area under investigation which is substantially independent of variations in the earth current circuit.

9. A system for electrical prospecting comprising an earth current circuit including a source of direct current, a pair of spaced earth electrodes, reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current, means for converting the picked-up potential difference into a uni-directional potential, a measuring circuit including a potentiometer, means controlled by the current flowing in said earth circuit to produce in said measuring circuit a current having a predetermined relation to said first current, means connecting said potentiometer to oppose said uni-directional picked-up potential, and a galvanometer connected to be actuated by the differential effect of the potential drop in a selected portion of said potentiometer and said uni-directional picked-up potential.

10. The method of electrical prospecting which comprises passing a current having a predetermined frequency through the earth between two spaced points adjacent the surface of the earth, picking up the potential difference between two other points adjacent the earth's surface and lying within the field of influence of said earth current, converting said potential difference into a unidirectional potential, producing simultaneously therewith a unidirectional measuring potential which bears a definite relationship to the total earth current at the instant of measurement, and obtaining a direct measurement of the electrical characteristics of the earth in the area under investigation by measuring the relationship between said unidirectional potential difference and the simultaneously produced unidirectional measuring potential.

11. The method of electrical prospecting which comprises passing a current having a predetermined frequency through the earth between two spaced points adjacent the surface of the earth, picking up the potential difference between two other points adjacent the earth's surface and lying within the field of influence of said earth current, converting said potential difference into a unidirectional potential, producing simultaneously therewith a unidirectional measuring potential which bears a definite relationship to the total earth current at the instant of measurement, and obtaining a direct measurement of the electrical characteristics of the earth in the area under investigation by balancing said unidirectional potential difference against a selected portion of the simultaneously produced measuring potential.

12. The method of electrical prospecting which comprises passing a direct current through the earth between two spaced points adjacent the surface of the earth, reversing said current at a predetermined frequency, picking up the potential difference between two other points adjacent the earth's surface and lying within the field of influence of said earth current, converting said potential difference into a unidirectional potential, converting into an alternating current having a frequency higher than said predetermined frequency the potential drop produced by passage of said earth current through a predetermined portion of the earth current circuit, rectifying said alternating current to produce a unidirectional measuring potential bearing definite relationship to the total earth current at the instant of measurement, and obtaining a direct measurement of the resistance characteristics of the earth in the area under investigation by measuring the relationship between said unidirectional potential difference and the simultaneously produced unidirectional measuring potential.

13. The method of electrical prospecting which comprises passing a direct current through the earth between two spaced points adjacent the surface of the earth, reversing said current at a predetermined frequency, picking up the potential difference between two other points adjacent the earth's surface and lying within the field of influence of said earth current, converting said potential difference into a unidirectional potential, converting into an alternating current having a frequency higher than said predetermined frequency the potential drop produced by passage of said earth current through a predetermined portion of the earth current circuit, transforming said alternating current, rectifying the transformed current to produce a unidirectional measuring potential bearing definite relationship to the total earth current at the instant of measurement, and obtaining a direct measurement of the resistance characteristics of the earth in the area under investigation by measuring the relationship between said unidirectional potential difference and the simultaneously produced unidirectional measuring potential.

14. The method of electrical prospecting which comprises passing a direct current through the earth between two spaced points adjacent the surface of the earth, reversing said current at a predetermined frequency, picking up the potential difference between two other points adjacent the earth's surface and lying within the field of influence of said earth current, converting said potential difference into a unidirectional potential, converting into an alternating current having a frequency higher than said predetermined frequency the potential drop produced by passage of said earth current through a predetermined portion of the earth current circuit, rectifying said alternating current, passing the rectified current through a resistor element to produce a unidirectional measuring potential bearing definite relationship to the total earth current at the instant of measurement, and obtaining a direct measurement of the resistance characteristics of the earth in the area under investigation by measuring the relationship between said unidirectional potential difference and the simultaneously produced unidirectional measuring potential.

15. The method of electrical prospecting which comprises passing a current having a predetermined frequency through the earth between two spaced points adjacent the surface of the earth, picking up the potential difference between two other points adjacent the earth's surface and lying within the field of influence of said earth current, converting said potential difference into a unidirectional potential suited to actuate a direct current indicator, producing simultaneously therewith a unidirectional measuring potential which bears a definite relationship to the total earth current at the instant of measurement, and obtaining a direct measurement of the electrical characteristics of the earth in the area under investigation by measuring the relationship between said pick-up potential difference and the simultaneously produced unidirectional measuring potential.

16. The method of electrical prospecting which comprises passing a current having a predetermined frequency through the earth between two spaced points adjacent the surface of the earth, picking up the potential difference between two other points adjacent the earth's surface and lying within the field of influence of said earth current, rectifying said picked-up potential to produce a unidirectional potential, actuating a direct current indicator by said last potential, producing simultaneously therewith a measuring potential which bears a definite relationship to the total earth current at the instant of measurement, balancing said measuring potential against said picked-up potential, adjusting the relationship between said measuring potential and said picked-up potential to bring the resultant rectified picked-up potential to a predetermined value as shown by said indicator and thereby obtaining from said adjustment a direct measurement of the resistance characteristics of the earth in the area under investigation.

17. A system for electrical prospecting comprising an earth current circuit including a source of direct current, a pair of spaced earth electrodes, and reversing means connected between said source and said electrodes for reversing the direct current at a predetermined controlled frequency whereby an earth current having a predetermined frequency is passed through the earth between said electrodes, a potential circuit including potential pick-up means located at spaced points adjacent the earth's surface lying within the field of influence of said earth current and means for converting the picked-up potential difference into a unidirectional potential, means measuring said unidirectional potential, means deriving from said earth current circuit a measuring potential which bears a definite relationship to the total earth current at the instant of measurement, means superimposing said measuring potential on said potential circuit to oppose said picked-up potential difference and means adjusting the relationship between said measuring potential and said picked-up potential to obtain a predetermined response on said measuring means, to obtain by said adjustment a direct measurement of the electrical characteristics of the earth in the area under investigation which is substantially independent of variations in the earth current circuit.

KNUTE H. EVJEN.